US010558481B2

(12) United States Patent
Rajan et al.

(10) Patent No.: US 10,558,481 B2
(45) Date of Patent: Feb. 11, 2020

(54) CROSS-FUNCTION VIRTUALIZATION OF A TELECOM CORE NETWORK

(71) Applicant: INTEL CORPORATION, Santa Clara, CA (US)

(72) Inventors: Ashok Sunder Rajan, Burnaby (CA); Richard A. Uhlig, Hillsboro, OR (US); Rajendra S. Yavatkar, Portland, OR (US); Tsung-Yuan C. Tai, Portland, OR (US); Christian Maciocco, Portland, OR (US); Jeffrey R. Jackson, Newberg, OR (US); Daniel J. Dahle, Wilsonville, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/812,888

(22) Filed: Nov. 14, 2017

(65) Prior Publication Data

US 2018/0225136 A1     Aug. 9, 2018

Related U.S. Application Data

(63) Continuation of application No. 14/128,010, filed as application No. PCT/US2013/065230 on Oct. 16, 2013, now Pat. No. 9,817,684.

(Continued)

(51) Int. Cl.
*G06F 9/455*     (2018.01)
*G06F 9/50*      (2006.01)
(Continued)

(52) U.S. Cl.
CPC .......... *G06F 9/45533* (2013.01); *G06F 9/455* (2013.01); *G06F 9/45537* (2013.01);
(Continued)

(58) Field of Classification Search
CPC .................................. G06F 9/44–2009/45595
(Continued)

(56) References Cited

U.S. PATENT DOCUMENTS

| 6,222,529 B1 | 4/2001 | Ouatu-Lascar et al. |
| 7,539,631 B1 | 5/2009 | El-Haj |

(Continued)

FOREIGN PATENT DOCUMENTS

| CN | 101904190 A | 12/2010 |
| CN | 101986666 A | 3/2011 |

(Continued)

OTHER PUBLICATIONS

International Search Report and Written Opinion issued in PCT Application No. PCT/US2013/065230, dated Jan. 24, 2014, 11 pages.

(Continued)

*Primary Examiner* — Mehran Kamran
(74) *Attorney, Agent, or Firm* — Grossman, Tucker, Perreault & Pfleger, PLLC

(57) ABSTRACT

In the present disclosure, functions associated with the central office of an evolved packet core network are co-located onto a computer platform or sub-components through virtualized function instances. This reduces and/or eliminates the physical interfaces between equipment and permits functional operation of the evolved packet core to occur at a network edge.

16 Claims, 3 Drawing Sheets

Related U.S. Application Data

(60) Provisional application No. 61/714,518, filed on Oct. 16, 2012.

(51) Int. Cl.
*H04L 12/24* (2006.01)
*G06F 9/445* (2018.01)

(52) U.S. Cl.
CPC ............ *G06F 9/5077* (2013.01); *H04L 41/00* (2013.01); *G06F 9/445* (2013.01)

(58) Field of Classification Search
USPC .......................................................... 718/1
See application file for complete search history.

(56) References Cited

U.S. PATENT DOCUMENTS

| | | | |
|---|---|---|---|
| 8,276,139 B2* | 9/2012 | Bozek | G06F 9/5044 370/395.2 |
| 8,874,743 B1 | 10/2014 | Heidelberger et al. | |
| 9,003,037 B2 | 4/2015 | Beveridge | |
| 9,817,684 B2 | 11/2017 | Rajan et al. | |
| 2008/0320553 A1 | 12/2008 | Balay et al. | |
| 2009/0103492 A1 | 4/2009 | Altshuller et al. | |
| 2010/0306163 A1 | 12/2010 | Beaty et al. | |
| 2011/0078679 A1* | 3/2011 | Bozek | G06F 9/455 718/1 |
| 2011/0289555 A1 | 11/2011 | DeKoenigsberg et al. | |
| 2012/0014284 A1 | 1/2012 | Ranganathan et al. | |
| 2012/0044876 A1 | 2/2012 | Taaghol | |
| 2012/0221700 A1 | 8/2012 | Dutta et al. | |
| 2012/0271903 A1 | 10/2012 | Luna | |
| 2012/0303835 A1 | 11/2012 | Kempf et al. | |
| 2012/0317260 A1* | 12/2012 | Husain | G06F 3/14 709/223 |
| 2013/0121207 A1 | 5/2013 | Parker | |
| 2013/0136032 A1 | 5/2013 | Meirosu et al. | |
| 2013/0336286 A1 | 12/2013 | Anschutz | |
| 2014/0032761 A1 | 1/2014 | Beveridge | |
| 2014/0375436 A1 | 12/2014 | Rezvani et al. | |
| 2014/0375437 A1 | 12/2014 | Rezvani et al. | |
| 2015/0017950 A1 | 1/2015 | Zhao et al. | |
| 2015/0052215 A1 | 2/2015 | Luna | |

FOREIGN PATENT DOCUMENTS

| | | |
|---|---|---|
| EP | 2485564 A1 | 8/2012 |
| WO | 2011-144224 A1 | 11/2011 |
| WO | 2012-160465 A1 | 11/2012 |
| WO | 2014-062796 A1 | 4/2014 |

OTHER PUBLICATIONS

Baliga, et al., "VPMN—Virtual Private Mobile Network Towards Mobility as-a-Service", MCS' 11, Jun. 28, 2011, 5 pages. Available at: http: //www2.research.att.com/-kobus/docs/vpmn.pdf.

Chinese Office Action issued in Chinese Application No. 2013800045129, dated Jun. 29, 2016, with English translation, 19 pages.

German Office Action issued in German Application No. 112013000423.2, dated Dec. 15, 2015, with English translation, 12 pages.

International Preliminary Report on Patentability and Written Opinion issued in PCT Application No. PCT/US2013/065230, dated Apr. 21, 2015, 7 pages.

Carapinha, Jorge, et al.: "Network Virtualization—a View from the Bottom", Aug. 17, 2009, pp. 73-80.

Hoffmann, Marco, et al.: "Network Virtualization for Future Mobile Networks", IEEE, 2011, 5 pages.

Niebert, Norbert, et al.: "Network Virtualization: A Viable Path Towards the Future Internet", Mar. 5, 2008, pp. 511-520.

Forde, Timothy K., et al.: "Exclusive Sharing & Virtualization of the Cellular Network", 2011, pp. 337-348.

Steiner, Moritz, et al.: "Shortcuts in a Virtual World", 2006, 9 pages.

Lee, C.C., et al.: "The Project Management of the Profit Contribution from the Customers of Mobile Virtual Private Network Services", IEEE, 2010, pp. 874-878.

Notice of Allowance issued in U.S. Appl. No. 14/128,010 dated Jul. 19, 2017, 11 pages.

Notice of Allowance issued in U.S. Appl. No. 14/128,010 dated Aug. 21, 2017, 5 pages.

Office Action issued in U.S. Appl. No. 14/128,010 dated Aug. 22, 2016, 18 pages.

Office Action issued in U.S. Appl. No. 14/128,010 dated Sep. 11, 2015, 19 pages.

Final Office Action issued in U.S. Appl. No. 14/128,010 dated Apr. 18, 2016, 20 pages.

Final Office Action issued in U.S. Appl. No. 14/128,010 dated Apr. 20, 2017, 20 pages.

\* cited by examiner

CROSS-FUNCTION VIRTUALIZATION OF A TELECOM CORE NETWORK

CROSS-REFERENCE TO RELATED APPLICATIONS

The present application is a continuation of U.S. patent application Ser. No. 14/128,010, filed Dec. 20, 2013, which is a National Phase Application of PCT Application No. PCT/US2013/065230, filed on Oct. 16, 2013, which in turn claims benefit of U.S. Provisional Application Ser. No. 61/714,518, filed Oct. 16, 2012, the entire disclosures of which are incorporated herein by reference.

BACKGROUND

Current demand for data on wireless networks is growing significantly. Wireless network service providers are struggling to address this demand by expanding their radio coverage and efficiency. The lesser known struggle of operators is the capacity build out that needs to happen at the network core through which all the radio access gear connect.

Radio access technology advancements make spectrum usage increasingly efficient, i.e., increased number of bearer channels for a given bandwidth of radio spectrum. This allows wireless network operators to scale their network with a fine degree of granularity to pinpoint and address data demands Technology improvements at the network core however do not allow the same degree granular scalability, i.e., the capacity increases at the core are possible in much larger steps than that possible in the radio access network. This leaves the wireless network operators with financially inefficient capital expenditure (CAPEX) investments on the network core infrastructure. To compound this issue, core network equipment technology advancements continue on proprietary paths without leveraging from the huge advancements made in data center technologies. This burdens wireless network operators with operating expenditures (OPEXs) that are too heavy to allow flexible scaling out of the network core tailored to demands per market segments (traffic types).

Approaches thus far have focused at increasing the performance of each of the equipment in the network core infrastructure. Most of this has been to performance tune the data plane stack of this equipment. While this gives better performing hardware units at near same costs, it does nothing to address the CAPEX/OPEX troubles faced by Wireless Network Operators in scaling out their networks.

BRIEF DESCRIPTION OF DRAWINGS

Features and advantages of the claimed subject matter will be apparent from the following detailed description of embodiments consistent therewith, which description should be considered with reference to the accompanying drawings, wherein:

Although the following Detailed Description will proceed with reference being made to illustrative embodiments, many alternatives, modifications, and variations thereof will be apparent to those skilled in the art.

DETAILED DESCRIPTION

In the present disclosure, functions associated with the central office of an EPC network are co-located onto a computer platform or sub-components through virtualized function instances. This reduces and/or eliminates the physical interfaces between equipment allowing a level of integration that brings performance improvements and scalability currently not achievable.

Figure 1:
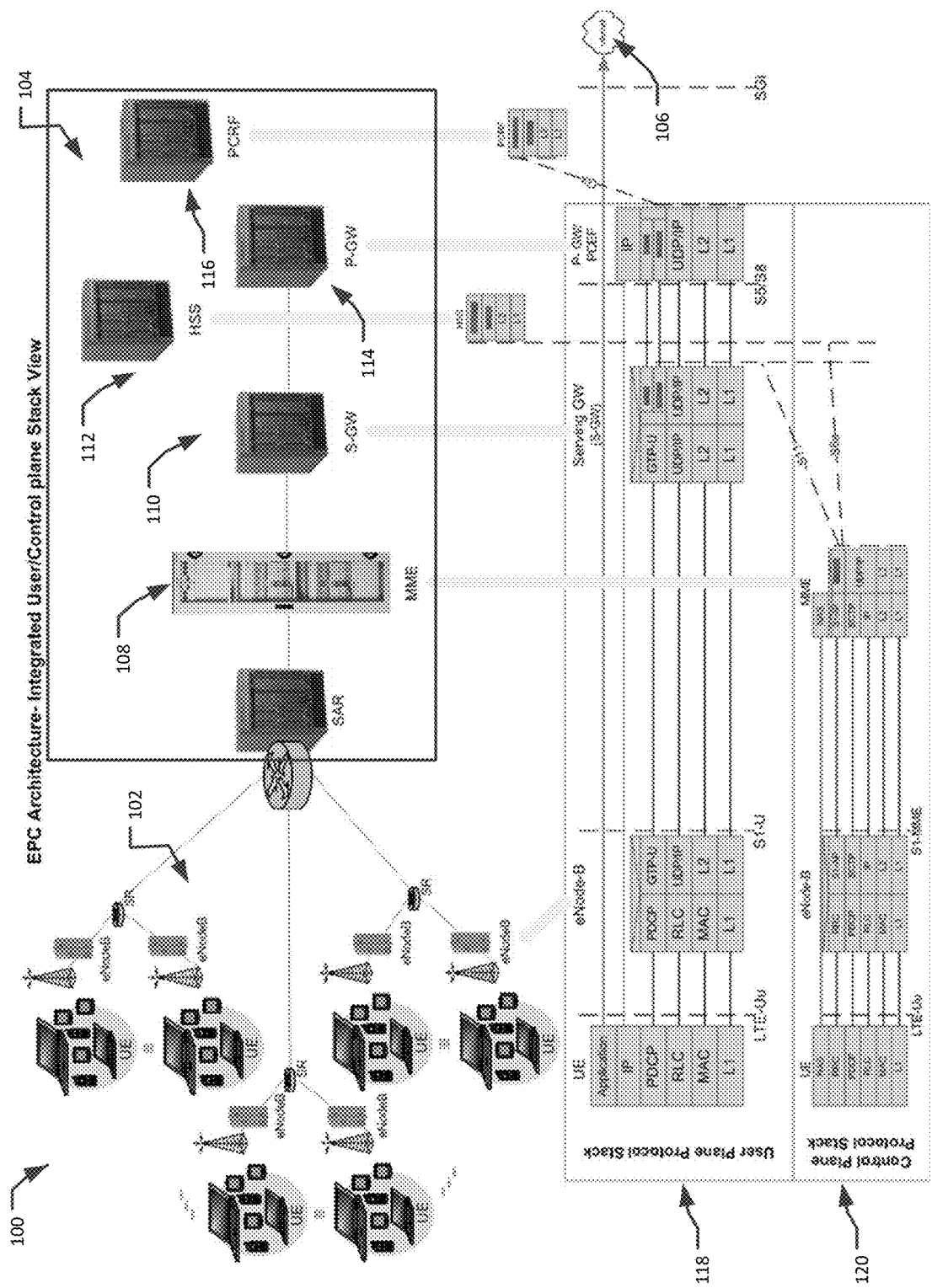
FIG. 1 illustrates a conventional telecom network architecture.

FIG. 1 depicts a conventional wireless telecom network system 100. The system 100 generally includes a radio access network (RAN) 102 and a central office 104. The system 100 includes a plurality of hardware devices, hardware platforms and associated signaling, functionality, and definition which may generally comply with, or otherwise be compatible with, the Third Generation Partnership Project (3GPP) Long Term Evolution (LTE) and/or LTE-Advanced (LTE-A) based wireless network standard, including current, previous and future versions of that standard. These may include, for example, 3GPP TS 36.212: "Evolved Universal Terrestrial Radio Access (E-UTRA); Multiplexing and channel coding", 3GPP TS 36.211: "Evolved Universal Terrestrial Radio Access (E-UTRA); Physical channels and modulation", 3GPP TS 23.221, 3GPP TS 24.301, 3GPP TS 36.413, 3GPP TS 33.401, etc. Reference to hardware platforms (e.g., UE, eNodeB, MME, SGW, HSS, PGW, PCRF, etc.) and associated signaling and functionality, as used herein, may be generally defined by the aforementioned 3GPP standards, and/or derivatives thereof.

The system 100 is configured to exchange commands and/or data with other servers/systems/devices via network 106, and to exchange commands and/or data with various platforms in the central office 104 and/or the RAN 102. The system 100 may communicate using a switched fabric communications protocol, for example, an Ethernet communications protocol, etc. The Ethernet communications protocol may be capable of providing communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in March, 2002 and/or later versions of this standard, for example, the IEEE 802.3 Standard for Ethernet, published 2012. Of course, the switched fabric communications protocol may include a custom and/or proprietary switched fabric communications protocol. The user plane protocol stack 118 and control plane protocol stack 120 are also illustrated in FIG. 1 for various devices in the RAN 102 and central office 104. The stack 118 and/or 120 is/are generally compatible with the aforementioned 3GPP standard and/or Ethernet protocol.

The RAN 102 generally includes plurality of end-user devices (UEs), cell towers and local nodes (eNodeB) which collectively form part of the local wireless network. The UEs may include, for example wireless handheld devices (e.g., iPad®, etc.), smartphones (e.g., iPhone®, Galaxy®, etc.). The towers are each configured to communicate with eNodeB systems, as is shown. Each tower and/or eNodeB device may form an edge of the network system 100. The collection of devices in the RAN 102 are configured to communicate with the central office 104. The central office 104 (also referred to herein as an "evolved packet core (EPC)") is generally configured to perform a variety of functions associated with deployment and management of the wireless system and wireless devices. To that end, the central office 104, in the conventional system, includes a plurality of independent hardware systems to provide the functionality that is required by the network. For example, a typical central office 104 may include an MME (mobility management entity) platform 108 which is configured for signaling, bearer and state management functions of the central office 104, which may include, for example, management of the number of devices (e.g., devices in RAN 102) attached to the network 100, identification of the cell tower each device is attached to, manage specific service requests from one or more of the devices, manage idle and active connection of devices, manage movement of devices between towers/eNodeB's, etc., and/or other functionality as may be defined by the aforementioned 3GPP standards.

The central office 104 also typically includes a serving gateway (SGW) platform 110 configured for service (bearer) negotiation and generally operates as a high performance service aggregation router primarily designed for high data throughput. For example, the SGW 110 is configured to exchange commands and data with the MME 108 when a device attaches to an eNodeB, on a specific service request, on a remote device handover, etc. The SGW 110 is also configured to provide user plane termination points for each eNodeB device, exchange commands and data with the packet gateway (PGW, discussed below) 114 to set up the user plane for accepted bearers, and route user plane command flows between the eNodeB and the PGW 114, etc., and/or other functionality as may be defined by the aforementioned 3GPP standards.

The central office 104 also typically includes a home subscription server (HSS) 112, which is a database to store profile and credential information for each UE (and/or subscriber), etc., and/or other functionality as may be defined by the aforementioned 3GPP standards. The central office 104 also typically includes a PGW 114 configured to provide a gateway between the system 100 and the network 106 (e.g., Internet). The PGW 114 is generally configured to provide decoding of eNodeB data (e.g., GTP-U payloads) onto network routers (not shown) to transmit the data to one or more external networks 106, encoding incoming traffic from the network 106 into GTP-U payloads by encoding destination eNodeB address information, and routing GTP-U data flows to an appropriate interface of the SGW 110, etc., and/or other functionality as may be defined by the aforementioned 3GPP standards. The central office 104 also typically includes a policy and rules function (PCRF) device 116 configured to manage policy and/or specific rules for each UE (and/or subscriber), etc., and/or other functionality as may be defined by the aforementioned 3GPP standards. By design, each of the platforms of the conventional telecom architecture 100 is deployed on independent hardware systems, as generally depicted in FIG. 1, and these platforms typically communicate with one another using the aforementioned Ethernet communication protocol (and/or a proprietary switched packet communication protocol).

FIG. 1 also illustrates details of a typical end-to-end Evolved Packet System (EPS) wireless network configuration. In this configuration, an eNodeB (which are the Radio Access network towers or small radio access points) establishes a bearer or path to the internet for the devices (UEs) that attach to them. The bearer is specific to the nature of the traffic it carries. For example, browsing and email typically require default bearers while audio or video streaming will need special bearers. A UE, attached to an eNodeB, can establish a plurality of bearers associated to one or more application sessions being executed on the UE. Both the type of bearer and the number of bearers established by a UE need to be negotiated through the central office 104. On successful negotiation of a bearer, the PGW 114 provides external internet access by the application running on the UE.

Bearer negotiation typically occurs at application startup and continues through the entire duration of execution of the application. This allows a) the UE to move across eNodeBs (i.e., handover), and b) application richness, e.g., a browsing application to launch an audio or video stream. In the system 100, bearer negotiation is generally provided by signaling messages carried over IP, as may be defined by the aforementioned 3GPP standards. These signaling messages are typically short, e.g., 50 to 100 bytes, but typically large in number, depending on the number of applications running and the number of UE on the system 100. The signaling messages from the eNodeBs/UEs are transmitted to the central office 104 (typically transmitted to the MME 108 and SGW 110), typically at 10 to 50 us intervals in any given network configuration. The devices of the central office 104 are connected over a network provider or carrier backbone and all signaling as well as application traffic is backhauled from the eNodeB on the metro-Ethernet. The application payload is delivered to the internet backbone only if all the signaling checks are met by the central office 104 on the carrier backbone.

As described above, bearer negotiation is distributed across physically separate elements, therefore, functional scalability and performance of the EPC 104 is limited. For example: as small cells are added to address hotspots of local data demand the number of subscribers (or devices) an MME 108 can handle is severely affected, and the SGW 110 is a high performance service aggregation router primarily designed for high data throughput (e.g., 80 Tbps). The signaling traffic that it receives will typically significantly degrade its capacity. This lack of functional and performance scalability of the EPC 104 is the reason for the high OPEX (greater than 80% in some instances) of network operators.

Figure 2:
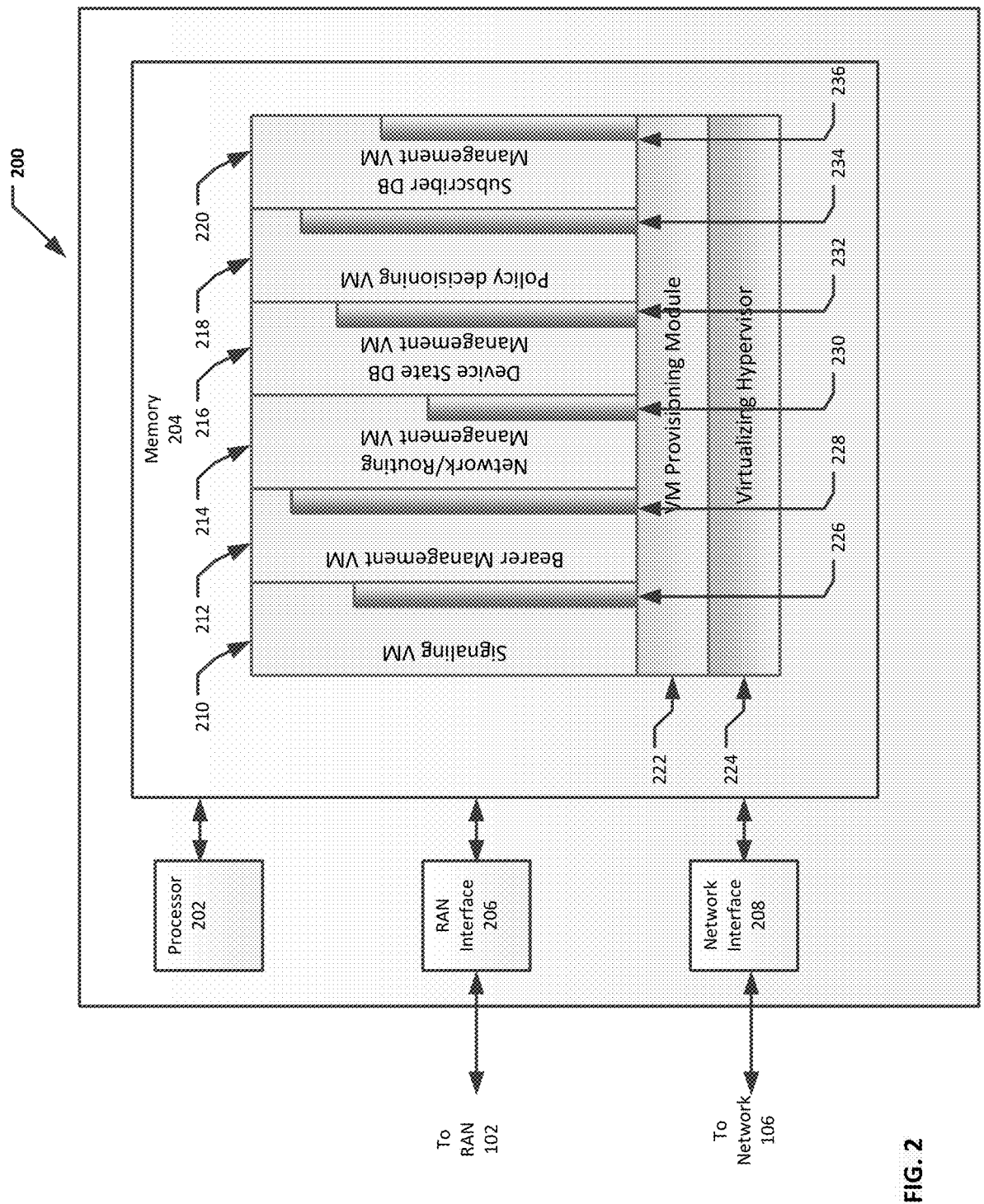
FIG. 2 illustrates a scalable hardware platform according to the present disclosure.

FIG. 2 illustrates a scalable hardware platform 200 according to the present disclosure. In the present disclosure, the hardware platform 200 is configured to host virtualized instances of the various hardware systems of the central office 104. Thus, instead of requiring multiple hardware platforms, a single hardware platform may be used for all or part of the functionality of the central office 104. By virtualizing the various functions of the central office 104, the present disclosure provides scalability based on application-specific characteristics, and reduces or eliminates the penalty associated with physical interfaces (as required by the conventional approach).

The platform 200 includes a system processor 202 (e.g., multi-core general purpose processor, such as those provided by Intel Corp., etc.), system memory 204, RAN interface circuitry 206 and network interface circuitry 208. The RAN interface 206 is configured to provide an interface between the plurality of virtual machine (VM) instances hosted in memory 204 and the radio network 102. The RAN interface 206 and the signaling between the RAN 102 and the platform 200 may comply with the aforementioned 3GPP standards. The network interface circuitry 208 is configured to provide an interface between the network 106 and the platform 200. The network interface circuitry 208 and the signaling between the network interface circuitry 208 and the platform 200 may comply with the aforementioned IEEE Ethernet standard. The memory 204 is configured store a plurality of virtual machine (VM) modules, as will be described in greater detail below.

The VM modules stored in memory 204 include a VM provisioning module 222 configured to provision hardware resources associated with the platform 200 and assign the hardware resources to one or more of the plurality of VM modules 210-220. The hardware resources may include, for example, one or more cores associated with processor 202, the RAN interface 206, network interface 208, the size of memory 204, etc. A virtualizing hypervisor 224 is configured to abstract the hardware resources of the platform 200 to be utilized by the VM modules 210-220.

To provide virtualization of the functionality of the central office 104, the platform 200 of the present disclosure includes a signaling VM module 210 generally configured to provide at least a portion of the functionality of the MME 108 and at least a portion of the functionality of the SGW 110 of FIG. 1, described above. For example, the signaling VM module 210 may include one or more applications (running in a virtualized environment of the signaling VM 210) configured to provide interrogation of a subscriber database VM 220 (discussed below) and/or a policy decisioning VM 218 (discussed below) to authenticate a device (UE) for allocation of a bearer and/or a determination of how many UEs are attached to the system 100. The signaling VM module 210 may also be configured to determine an identity of a cell tower to which each UE is attached to the system 100. The signaling VM module 210 may also be configured to parse specific service requests from one or more UE. The signaling VM module 210 may also be configured to determine an active or idle state of one or more UE in the system 100. The signaling VM module 210 may also be configured to determine movement of a UE from one eNodeB/tower to another eNodeB/tower. The signaling VM module 210 may also be configured to cache active UE device state information to provide faster access to UE device state information (as opposed to a database look-up). The signaling VM module 210 may also be configured to update a device state database management VM 216 (discussed below), etc., and/or other functionality as may be defined by the aforementioned 3GPP standards for signaling and state management functions of the central office.

The platform 200 of the present disclosure also includes a bearer management VM module 212 generally configured to provide at least a portion of the functionality of the SGW 110 and at least a portion of the functionality of the MME 108, described above. For example, the bearer management VM module 212 may include one or more applications (running in a virtualized environment of the bearer management VM 212) configured to provide a termination point to an eNodeB for the data traffic from a UE (user plane), and/or route user plane data flows between an eNodeB and the networking/routing management VM module 114 (discussed below). The bearer management VM module 212 may also be configured to communicate with the signaling VM module 210 for UE management when one or more UEs attach to an eNodeB, when a UE communicates a specific service request, and/or when a UE moves between a tower/eNodeB (e.g., handover operations). The bearer management VM module 212 may also be configured to communicate with the networking/routing management VM module 114 (discussed below) to establish a user plane for one or more accepted bearers, etc., and/or other functionality as may be defined by the aforementioned 3GPP standards for service (bearer) negotiation and/or routing functions of the central office.

In addition, and in contrast to the conventional MME 108 and SGW 110, the bearer management VM module 212 may include one or more applications (running in a virtualized environment of the bearer management VM 212) configured to provide decoding of eNodeB data (e.g., GTP-U payloads) onto network routers (not shown) to transmit the data to one or more external networks 106, encoding incoming traffic from the network 106 into GTP-U payloads by encoding destination eNodeB address information, and routing GTP-U data flows to an appropriate RAN interface 206, provide interrogation of the device state database management VM 216 (discussed below) and/or a policy decisioning VM 218 (discussed below) to respond to specific bearer requests, for example, QoS requests, specific bearer requests, additional bearer requests, etc., and/or other functionality as may be defined by the aforementioned 3GPP standards.

The platform 200 of the present disclosure also includes a networking/routing management VM module 214 generally configured to provide at least a portion of the functionality of the PGW 114 of FIG. 1, described above. For example, the bearer management VM module 214 may include one or more applications (running in a virtualized environment of the networking/routing management VM module 214) configured to provide decoding of eNodeB data (e.g., GTP-U payloads) onto network routers (not shown) to transmit the data to one or more external networks 106, encoding incoming traffic from the network 106 into GTP-U payloads by encoding destination eNodeB address information, and routing GTP-U data flows to an appropriate interface of the SGW 110. The networking/routing management VM module 212 may also be configured to provide interrogation of the device state database management VM 216 (discussed below), etc., and/or other functionality as may be defined by the aforementioned 3GPP standards.

The platform 200 of the present disclosure also includes a device state database management VM module 216 generally configured to provide at least a portion of the functionality of the SGW 110 and the HSS 112 of FIG. 1, described above. In addition, and in contrast to the conventional SGW 110 and HSS 112, the device state database management VM module 216 may include one or more applications (running in a virtualized environment of the device state database management VM module 216) configured to provide database storage of the state of active and inactive UEs on the network. The device state database management VM module 216 may also be configured to communicate with the signaling VM module 210 to update active device state information, communicate with the bearer management VM module 212 to provide device state information for admitting additional service requests from one or more UEs, and communicate with the subscription database VM module 220 (described below) to determine if one or more UEs are properly subscribed for admittance onto the network, etc., and/or other functionality as may be defined by the aforementioned 3GPP standards.

The platform 200 of the present disclosure also includes a policy decisioning VM module 218 generally configured to provide at least a portion of the functionality of the PCRF 116 of FIG. 1, described above. For example, the policy decisioning VM module 218 may include one or more applications (running in a virtualized environment of the policy decisioning VM module 218) configured to manage policy and/or specific rules for each UE (and/or subscriber), etc., and/or other functionality as may be defined by the aforementioned 3GPP standards. The platform 200 of the present disclosure also includes a subscription database VM module 220 generally configured to provide at least a portion of the functionality of the HSS 112 of FIG. 1, described above. For example, the subscription database VM module 220 may include one or more applications (running in a virtualized environment of the subscription database VM module 220) configured to store profile and credential information for each UE (and/or subscriber), etc., and/or other functionality as may be defined by the aforementioned 3GPP standards.

Advantageously, the present disclosure provides virtualized instances to provide various functionality described herein, communication between two or more VM modules may be established using software procedure calls (e.g. semaphores (a synchronization mechanism established between two threads or processes to synchronize access to shared resources), etc.), instead of Ethernet (or other) communications which necessarily require stack protocols (e.g., user plane stack, control plane stack, etc.). Thus, communication between VM modules of the present disclosure may occur at much faster rates (e.g., memory speed instead of network speed) and with significantly reduced overhead compared to the conventional communication systems between platforms of the conventional central office 104.

In some embodiments, the VM instances have shared access to resource pools through the VM provisioning module. In operation, signaling as well as application traffic enters the carrier backbone, via the network interface 208 and/or RAN interface 206. However, instead of signaling messages being shuttled back and forth between different physical elements, messages are parsed by software processes initiated at one or more VM modules 210-220. The VM modules 210-222 may run simultaneously. Bearer negotiation signaling is performed by a set of software semaphores. Successful closure of all signaling semaphores and/or remote procedure calls (e.g., RAPI, etc.) permits application payloads to exit onto the Internet backbone. Reducing signaling message processing to software semaphores eliminates significant processing overhead associated with setting up of the IP transports of the conventional EPC architecture. Data transfer between various elements of the networking pipeline may occur at memory speed transfer instead of network speed transfer. The VM provisioning module 222 may be configured to communicate with application service providers e.g. Youtube, Fox, ESPN, etc. to provide scalable provisioning of virtualized functions associated with VM modules 210-220. This may enable application-specific tailoring of the central office infrastructure hitherto not possible with the boxed functions and physical interfaces.

In addition, instancing the functions in VM modules 210-220 provides scalable provisioning of hardware resources for each of the VM modules 210-220. Performance of each VM module may be tuned to the function requirements with additional VMs being instanced, as needed, to scale capacity based on load requirement of the RAN 102, network 106 and/or available hardware resources of the platform 200. The scalable provisioning is depicted by the shaded bars 226-236 within each respective VM module 210-220.

Also advantageously, the virtualized instances of the VM modules described herein may be deployed at various locations in response to network demand. Accordingly, while FIG. 2 depicts the platform 200 having VM modules 210-222, in some embodiments a subset of these modules may be deployed at any location within the network system in response to load demand to provide advantageous local deployment of various functions. These features may enable the virtualized instances of selected VM modules to provide greater responsiveness to traffic/load conditions at a specified location. Also, the virtual machine-based functionality provisioning described herein may provide de-centralization of the core network 104 allowing instances to run directly at targeted edges, e.g., enterprise or machine-to-machine (M2M) edge nodes. For example, the signaling VM module 210, bearer management VM module 212 and/or networking/routing management VM module 214 may be instanced at an eNodeB/tower location (e.g., deployed at a network edge) in response to heavy traffic demands, etc.

Figure 3:
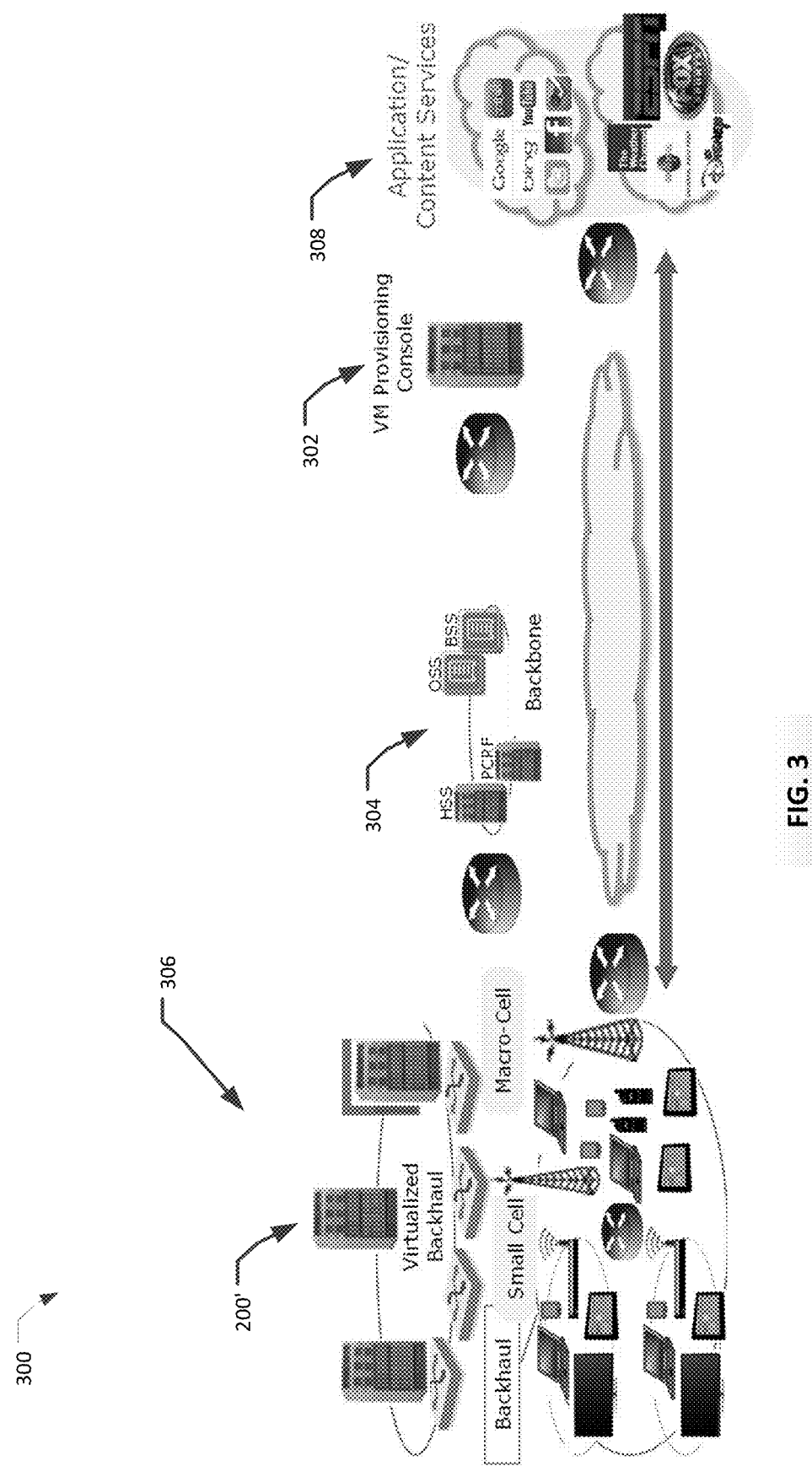
FIG. 3 illustrates a telecom network architecture according to various embodiments of the present disclosure.

FIG. 3 illustrates a telecom network architecture 300 according to various embodiments of the present disclosure. The telecom network architecture 300 includes various hardware and network topology components (e.g., eNodeB, cell towers, network, Ues, etc.) as the conventional telecom network 100, and certain items in FIG. 3 are graphically depicted the same as FIG. 1, and thus, the previously-described items shall have the same definition/description in FIG. 3 as described above with reference to FIG. 1. The telecom network architecture 300 generally complies, or is compatible, with the aforementioned 3GPP standards. With continued reference to FIGS. 1 and 2, the network 300 includes a VM provisioning platform 302, a core backbone 304, a RAN 306 and a plurality of application/content servers 308. The VM provisioning platform 202 is configured to communicate with the application/content servers 308 (e.g., Google, YouTube, ESPN, FOX, etc.) and generate one or more VM module instances at a selected location of the RAN 306, for example, as depicted by the reference number 200' deployed on a selected platform in the RAN 306. In this case, the 200' reference numeral is used to indicate that a subset of the VM instances depicted in FIG. 2 may be deployed. The core backbone 304 may include one or more platform systems configured to host instances of centralized functions, e.g., the policy decisioning VM module 218 and/or subscription database VM module 220.

In some embodiments, the VM provisioning platform 302 may be configured to provision instances of the VM modules to areas of incident demand, for example, as depicted at 200'. Thus, for example, the signaling VM module 210, bearer management VM module 212, network/routing management VM module 214 and/or device state database management VM module 218 may be instanced at a network edge location 200', based on, for example the load demand at a local. Centralized functions may be instanced on the backbone platform 304. Thus, in the present disclosure, functionality may be distributed and/or co-located to a network edge location (or other location of increasing load requirements) while other functionality may remain more centrally located. The functions may be instanced based on, for example, load conditions, available HW resources, etc.

Instancing of selected VM modules may also enable network operators or network providers to dynamically move and reposition these VM modules in the network based on network analytic, i.e. move the signaling VMs where most of the traffic will be at a specific time, e.g. 8 am US EST vs. 5 am PST in order to reduce backhaul traffic, save energy and improve real-time responses, etc. In some embodiments, the VM provisioning platform 302 may be configured to optimize placement of a VM module by analyzing network statistics so that the VM module is moved closer to the data source, i.e. the majority of callers in on a particular node.

The foregoing is based on example system architectures and methodologies, however, modifications to the present disclosure are possible. For example, platform 200 may include chipset circuitry, various bus circuitry, I/O circuitry, etc. The host processor 202 may include one or more processor cores and may be configured to execute system software. System software may include, for example, operating system code (e.g., OS kernel code) and local area network (LAN) driver code. LAN driver code may be configured to control, at least in part, the operation of the network interface 208. System memory may include I/O memory buffers configured to store one or more data packets that are to be transmitted by, or received by, network controller 104. Chipset circuitry may generally include "North Bridge" circuitry (not shown) to control communication between the processor 202, network interface 208, RAN interface 206 and system memory 204.

In some embodiments, the network interface 208 may be a network interface card (NIC) coupled to the platform 200 via a bus (not shown). The bus may comprise a bus that complies with the Peripheral Component Interconnect (PCI) Express™ Base Specification Revision 1.0, published Jul. 22, 2002, available from the PCI Special Interest Group, Portland, Oreg., U.S.A. (hereinafter referred to as a "PCI Express™ bus"). Alternatively, the bus instead may comprise a bus that complies with the PCI-X Specification Rev. 1.0a, Jul. 24, 2000, available from the aforesaid PCI Special Interest Group, Portland, Oreg., U.S.A. (hereinafter referred to as a "PCI-X bus"). Also alternatively, the bus may comprise other types and configurations of bus systems, without departing from this embodiment.

Platform 200 may further include an operating system (OS, not shown) to manage system resources and control tasks that are run on, e.g., platform 200. For example, the OS may be implemented using Microsoft Windows, HP-UX, Linux, or UNIX, although other operating systems may be used. In some embodiments, the OS may be replaced by a virtual machine monitor (or hypervisor) which may provide a layer of abstraction for underlying hardware to various operating systems (virtual machines) running on one or more processing units. The operating system and/or virtual machine may implement one or more protocol stacks. A protocol stack may execute one or more programs to process packets. An example of a protocol stack is a TCP/IP (Transport Control Protocol/Internet Protocol) protocol stack comprising one or more programs for handling (e.g., processing or generating) packets to transmit and/or receive over a network. A protocol stack may alternatively be comprised on a dedicated sub-system such as, for example, a TCP offload engine and/or network interface 208. The TCP offload engine circuitry may be configured to provide, for example, packet transport, packet segmentation, packet reassembly, error checking, transmission acknowledgements, transmission retries, etc., without the need for host CPU and/or software involvement.

The system memory may comprise one or more of the following types of memory: semiconductor firmware memory, programmable memory, non-volatile memory, read only memory, electrically programmable memory, random access memory, flash memory, magnetic disk memory, and/or optical disk memory. Either additionally or alternatively system memory may comprise other and/or later-developed types of computer-readable memory.

Embodiments of the operations described herein may be implemented in a system that includes one or more storage devices having stored thereon, individually or in combination, instructions that when executed by one or more processors perform the operations. The processor may include, for example, a processing unit and/or programmable circuitry in the network platform 200 and/or other processing unit or programmable circuitry. Thus, it is intended that operations according to the methods described herein may be distributed across a plurality of physical devices, such as processing structures at several different physical locations. The storage device may include any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

"Module", as used herein, may comprise, singly or in any combination code and/or instructions sets (e.g., software, firmware, etc.) that are configured to be executed and run by a processing device.

Accordingly, the present disclosure provides a platform for a wireless telecommunications network system. The platform includes a processor to execute instructions associated with a plurality of virtual machine (VM) modules; memory to store said plurality of virtual machine modules; a first interface to exchange commands and data between at least one VM module and at least one user equipment (UE) in communication with the platform; and a second interface to exchange commands and data between at least one VM module and a network in communication with the platform. The VM modules include a signaling VM module for, at least in part, state management of the at least one UE; and a network routing management VM module for, at least in part, routing data packets between the at least one UE and the network.

The present disclosure also provides a computer platform for hosting a virtual machine (VM) environment for exchanging commands and data associated with at least one user equipment (UE) in communication with the computer platform and for exchanging commands and data associated with a network in communication with the computer platform. The computer platform includes a signaling VM module for, at least in part, state management of at least one UE; a network routing management VM module for, at least in part, routing data packets between the at least one UE and the network; and a VM provisioning module for, at least in part, provisioning hardware resources associated with the computer platform and assigning the hardware resources to at least one of the signaling VM module or the network routing management VM module. The VM provisioning module is further for scaling of the hardware resources provisioned to the signaling VM module or the network routing management VM module based on, at least in part, load requirements of the at least one UE or the network.

The present disclosure also provides a method for virtualizing an evolved packet core (EPC) of wireless telecommunications network onto a computer platform, the computer platform for exchanging commands and data associated with at least one user equipment (UE) in communication with the computer platform and for exchanging commands and data associated with a network in communication with the computer platform. The method includes generating a signaling VM module for, at least in part, state management of at least one UE; generating a network routing management VM module for, at least in part, routing data packets between the at least one UE and the network; and generating a VM provisioning module for, at least in part, provisioning hardware resources associated with the computer platform and assigning the hardware resources to at least one of the signaling VM module or the network routing management VM module. The VM provisioning module is further for scaling of the hardware resources provisioned to the signaling VM module or the network routing management VM module based on, at least in part, load requirements of the at least one UE or the network.

The present disclosure also provides an example system that includes a computer platform system for virtualizing an evolved packet core (EPC) of wireless telecommunications network onto a computer platform, the computer platform for exchanging commands and data associated with at least one user equipment (UE) in communication with the computer platform and for exchanging commands and data associated with a network in communication with the computer platform comprising. The computer platform system includes one or more storage devices having stored thereon, individually or in combination, instructions that when executed by one or more processors result in the following operations including generate a signaling VM module for, at least in part, state management of at least one UE; generate a network routing management VM module for, at least in part, routing data packets between the at least one UE and the network; and generate a VM provisioning module for, at least in part, provisioning hardware resources associated with the computer platform system and assigning the hardware resources to at least one of the signaling VM module or the network routing management VM module. The VM provisioning module is further for scaling of the hardware resources provisioned to the signaling VM module or the network routing management VM module based on, at least in part, load requirements of the at least one UE or the network.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A platform for a wireless telecommunications network system, comprising:
   a processor to execute instructions associated with a plurality of virtual machines (VMs);
   memory to store the plurality of VMs;
   a radio access network (RAN) to communicate with a plurality of end-user devices (UEs); wherein at least one UE is local to a network edge location;
   a core backbone, separate from the network edge location;
   a first interface to exchange commands and data between the plurality of VMs and the plurality of UEs;
   a second interface to exchange commands and data between at least one VM and a network in communication with the platform; and
   VM provisioning circuitry to, at least in part, provision hardware resources associated with the platform, wherein the provisioning hardware resources includes generating at least one instance of at least one of the plurality of VMs;
   wherein at least one VM is a subscriber database VM generated at the core backbone; the subscriber database VM to manage profile and credential data associated with the at least one UE; and
   wherein at least one VM is a network routing management VM generated at the network edge location based on load requirements of at least one UE local to the network edge location; the network routing management VM to route data packets between the at least one UE and the network.

2. The platform of claim 1, wherein the VM provisioning circuitry is to:
   provision hardware resources associated with the platform;
   assign the hardware resources to one or more of the plurality of VMs; and
   scale the hardware resources provisioned to the one or more VMs based on, at least in part, load requirements of the at least one UE or the network.

3. The platform of claim 1, wherein the plurality of VMs further include a bearer management VM for, at least in part, bearer management of the at least one UE.

4. The platform of claim 3, wherein the bearer management VM is to enable bearer negotiation signaling via software semaphores.

5. The platform of claim 1, wherein the plurality of VMs further include a device state database management VM including one or more applications for, at least in part:
   providing database storage of data indicative of at least one of:
      the active state; or
      the idle state of the at least one UE; and
   communicating with the subscriber database VM to determine if the at least one UE is properly subscribed for admittance onto the wireless telecommunications network system.

6. The platform of claim 1, wherein the plurality of VMs further include:
   a signaling VM for, at least in part, determining an active state or idle state of the at least one UE; and
   a policy decisioning VM for, at least in part, management of service policy and rules associated with the at least one UE.

7. One or more non-transitory computer-readable storage devices having stored thereon instructions which, when executed by one or more processors, result in operations for virtualizing an evolved packet core (EPC) of wireless telecommunications network onto a computer platform, the operations comprising:
   exchange, via a first interface, commands and data between a plurality of VMs and a plurality of end-user devices (UEs) in communication with the computer platform;
   wherein at least one UE is local to a network edge location, the network edge location separate from a core backbone; and
   exchange, via a second interface, commands and data between at least one VM and a network in communication with the computer platform; and
   provision hardware resources associated with the computer platform, the provisioning of hardware resources including generating at least one instance of at least one of the plurality of VMs;

wherein at least one VM is a subscriber database VM generated at the core backbone; the subscriber database VM to manage profile and credential data associated with the at least one UE; and wherein at least one VM is a network routing management VM generated at the network edge location based on load requirements of at least one UE local to the network edge location; the network routing management VM to route data packets between the at least one UE and the network.

8. The one or more non-transitory computer-readable storage devices of claim 7, wherein the instructions, when executed by the one or more processors, result in operations comprising:

provision hardware resources associated with the computer platform;

assign the hardware resources to one or more of the plurality of VMs; and scale the hardware resources provisioned to the one or more VMs based on, at least in part, load requirements of the at least one UE or the network.

9. The one or more non-transitory computer-readable storage devices of claim 7, wherein the instructions, when executed by the one or more processors, result in operations comprising:

generate a bearer management VM for, at least in part, bearer management of the at least one UE.

10. The one or more non-transitory computer-readable storage devices of claim 7, wherein the instructions, when executed by the one or more processors, result in operations comprising:

generate a device state database management VM including one or more applications for, at least in part:
  providing database storage of data indicative of at least one of:
    the active state; or
    the idle state of the at least one UE; and
  communicating with the subscriber database VM to determine if the at least one UE is properly subscribed for admittance onto the wireless telecommunications network system.

11. The one or more non-transitory computer-readable storage devices of claim 7, wherein the instructions, when executed by the one or more processors, result in operations comprising:

generate a signaling VM for, at least in part, determining an active state or idle state of the at least one UE; and generate a policy decisioning VM for, at least in part, management of service policy and rules associated with the at least one UE.

12. A method for virtualizing an evolved packet core (EPC) of wireless telecommunications network onto a computer platform, the method comprising:

exchanging, via a first interface, commands and data between a plurality of VMs and a plurality of end-user devices (UEs) in communication with the computer platform;

wherein at least one UE is local to a network edge location, the network edge location separate from a core backbone; and exchanging, via a second interface, commands and data between at least one VM and a network in communication with the computer platform;

provisioning hardware resources associated with the computer platform, the provisioning of hardware resources including generating at least one instance of at least one of the plurality of VMs wherein at least one VM is a subscriber database VM generated at the core backbone; the subscriber database VM to manage profile and credential data associated with the at least one UE; and wherein at least one VM is a network routing management VM generated at the network edge location based on load requirements of at least one UE local to the network edge location; the network routing management VM to route data packets between the at least one UE and the network.

13. The method of claim 12, further comprising:

provisioning hardware resources associated with the computer platform;

assigning the hardware resources to one or more of the plurality of VMs; and scaling the hardware resources provisioned to the one or more VMs based on, at least in part, load requirements of the at least one UE or the network.

14. The method of claim 12, further comprising generating a bearer management VM for, at least in part, bearer management of the at least one UE.

15. The method of claim 12, further comprising generating a device state database management VM including one or more applications for, at least in part:
  providing database storage of data indicative of at least one of:
    the active state; or
    the idle state of the at least one UE; and
  communicating with the subscriber database VM to determine if the at least one UE is properly subscribed for admittance onto the wireless telecommunications network system.

16. The method of claim 12, further comprising:

generating a signaling VM for, at least in part, determining an active state or idle state of the at least one UE; and generating a policy decisioning VM for, at least in part, management of service policy and rules associated with the at least one UE.

* * * * *